April 24, 1951     H. D. HUME     2,549,814
TRAILER HITCH

Filed Nov. 12, 1947     2 Sheets-Sheet 1

Inventor
Horace D. Hume
By
Attorney

April 24, 1951 H. D. HUME 2,549,814
TRAILER HITCH

Filed Nov. 12, 1947 2 Sheets-Sheet 2

Inventor
Horace D. Hume
By Smith & Wells
Attorney

Patented Apr. 24, 1951

2,549,814

UNITED STATES PATENT OFFICE 2,549,814

TRAILER HITCH

Horace D. Hume, Mendota, Ill.

Application November 12, 1947, Serial No. 785,269

6 Claims. (Cl. 280—33.9)

My invention relates to improvements in a trailer hitch.

It is common practice, in attaching trailers to a tow car or power vehicle, to have the universal connection mounted at about the level of the bumper at the rear of the tow car. This is a convenient position, and usually the attachment of the ball unit, or its equivalent, is made rigid with the bumper, and additional bracing, if necessary, is made direct to the frame of the tow car. With a simple universal connection there is considerable bouncing of the tow car when travelling over rough roads. Also, there is a considerable tendency for side-swaying of both the tow car and the trailer.

It is the purpose of my invention to provide, in connection with the attachment frame using any suitable universal connection to the tow car, a tension spring arrangement whereby the side-swaying and bouncing or settling can be eliminated as bad features in the towing of trailers behind a regular passenger car.

According to my invention, I provide the usual attachment frame on the trailer and connect it to the frame of the tow car at the rear bumper by means of an ordinary ball and socket or universal connection of any suitable type. This connection is, of course, located above the axle line of both vehicles a considerable distance. Rigid brackets are provided on the attachment frame and on the tow car bumper or frame. These brackets extend down below the axle line of the two vehicles and are connected at the lower ends by one or more tension springs, which are of such strength as to withstand the rough usage to which they are subjected. These springs are adjusted in relation to the load of the trailer, as indicated by the downward pressure at the universal connection, so as to substantially balance the settling tendency at the universal connection.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 5 is a view taken on the line 5—5 of Figure 3 with the rigid part of the attachment frame left out.

Figure 1:
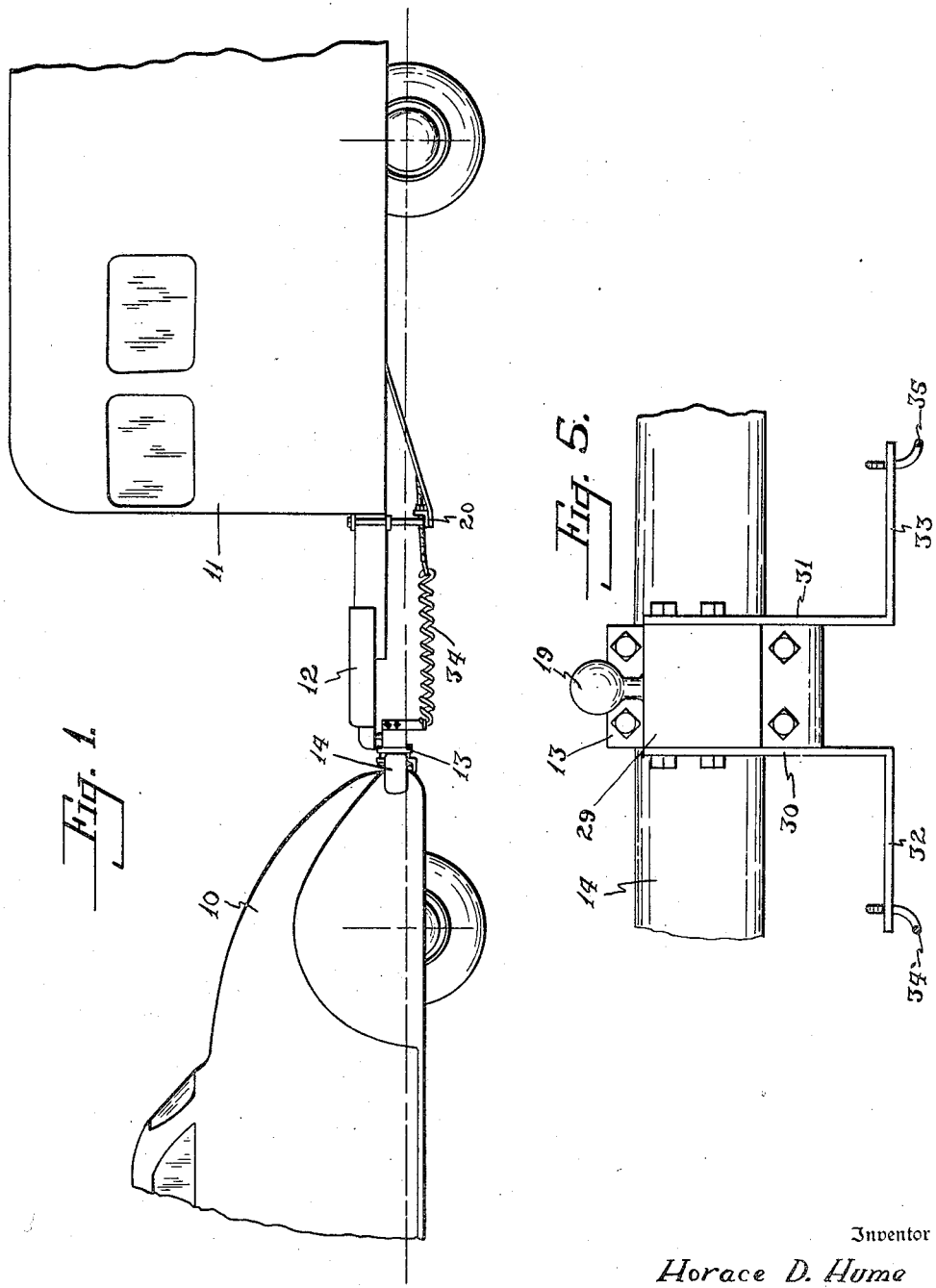
Figure 1 is a fragmentary view, inside elevation, of a tow car and trailer connected by my improved trailer hitch.
Figure 2:
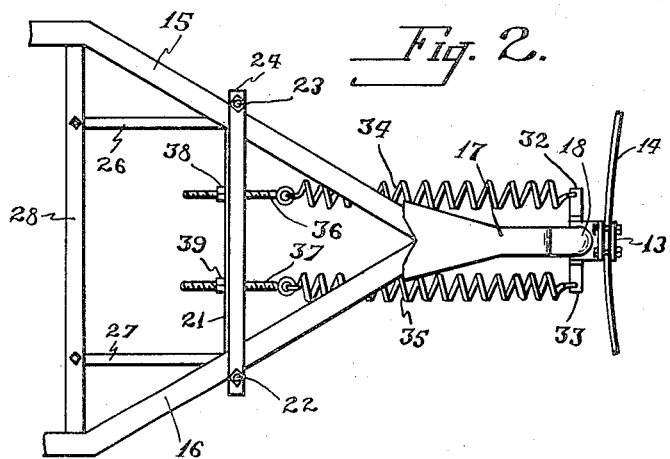
Figure 2 is a fragmentary plan view of the attachment frame which connects the tow car and trailer.
Figure 3:
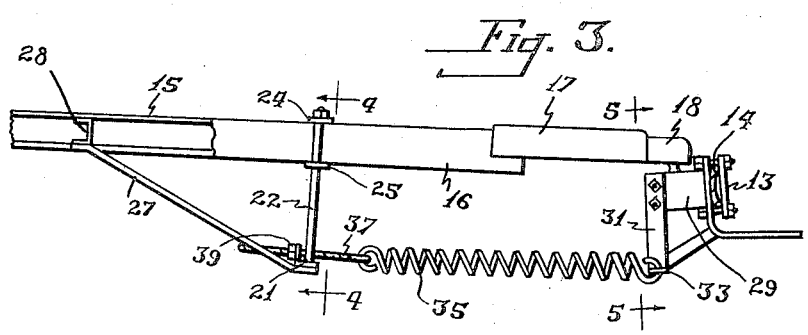
Figure 3 is a view, inside elevation, of the attachment frame.
Figure 4:
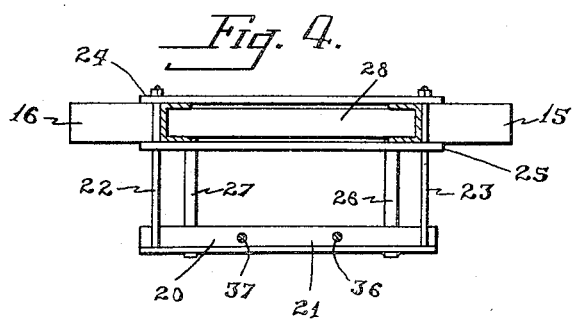
Figure 4 is a sectional view taken on the line 4—4 of Figure 3.

Referring now to the drawings, my invention as shown is embodied in a trailer hitch adapted to connect a tow car or power vehicle 10 and a trailer 11. The trailer is provided with an attachment frame 12 that includes a clamping mechanism 13, which is bolted to the bumper 14 of the tow car. The attachment frame has two channel irons 15 and 16 extending forwardly from the trailer and usually forming a rigid part of the trailer frame. These channel irons are connected to a tongue section 17, which has a socket 18 at its forward end for engaging the ball 19 that is carried by the clamping mechanism 13. The details of the ball and socket connection have not been illustrated, since any universal connection at this point may be used and the details of such universal connections are well known.

According to my invention I provide on the attachment frame, at some distance rearward from the universal connection, a bracket 20 extending well below the axle line of the tow car and trailer. This bracket is formed by securing an angle iron 21 to two upright rods 22 and 23. The rods 22 and 23 are connected to the channel irons 15 and 16 by plates 24 and 25. Braces 26 and 27 are welded to angle iron 21 and extended rearwardly and upwardly to a cross brace 28 that extends between the channel irons 15 and 16.

The ball 19 is mounted on a rectangular box-like portion 29 of the clamping mechanism 13. This box-like portion also carries two L-shaped brackets 30 and 31 which extend downwardly and outwardly, so that the lower portions 32 and 33 thereof are well below the axle line of the tow car and trailer. I use two tension springs 34 and 35 to connect the brackets 30 and 31 with the bracket 20. The springs are hooked into the lower portions 32 and 33 of the brackets 30 and 31 and have eye bolts 36 and 37 at their rear ends. These eye bolts pass through the angle iron 21 and are provided with nuts 38 and 39 for adjusting the tension of the springs 34 and 35.

In operation of this trailer hitch, when there is any settling at the universal connection, the springs 34 and 35 will be extended. If these springs are under the proper tension, they will offset the settling and in this way eliminate the excessive bouncing of the tow car. If there is any side-swaying, this will tend to extend one spring more than the other and the springs will act to overcome the side-swaying. With this arrangement I obtained flexibility of the usual universal connection employed in trailer hitches without the disadvantages of excessive bouncing or settling due to the load of the trailer on the rear bumper of the tow car and the pull of the trailer at a level above the axle line of the two vehicles.

Having thus described my invention, I claim:

1. A coupling apparatus for connecting a trailer to a power vehicle comprising an attachment frame rigidly secured to the trailer and having a universal connection at the forward end thereof for attachment to the frame of the power vehicle and positioned substantially above the axle line of both the power vehicle and the trailer, rigid brackets depending from the attachment frame and brackets rigidly connected to power vehicle frame and depending below the said axle lines, and transversely spaced tension springs connecting said first named brackets with the second named brackets at a level below the axle line whereby the springs are extended when the universal connection moves downward.

2. A coupling apparatus for connecting a trailer to a power vehicle comprising an attachment frame rigidly secured to the trailer and having a universal connection at the forward end thereof for attachment to the frame of the power vehicle and positioned substantially above the axle line of both the power vehicle and the trailer, a bracket depending from the attachment frame and spaced rearwardly from the universal connection, a second depending bracket rigidly connected with the power vehicle frame at the forward end of said attachment frame, and spring means under tension connecting said brackets at a level substantially below the said axle line, and thereby opposing downward movement of the universal connection.

3. A coupling apparatus for connecting a trailer to a power vehicle comprising an attachment frame rigidly secured to the trailer and having a universal connection at the forward end thereof for attachment to the frame of the power vehicle and positioned substantially above the axle line of both the power vehicle and the trailer, a depending bracket on said attaching frame rearwardly of the universal connection and spring means extending from the lower end of said bracket forwardly and secured to the power vehicle frame below the axle line of the power vehicle, opposing downward movement of said universal connection.

4. A coupling apparatus for connecting a trailer to a power vehicle comprising an attachment frame having means for rigidly securing it to the trailer and having a clamping mechanism for rigid attachment to the power vehicle, said frame having a universal connection between the clamping mechanism and the part of the frame that is rigidly connected to the trailer the connection being positioned above the axle line of the power vehicle and the trailer, a bracket extending downwardly from said clamping mechanism below the axle lines of the vehicle and trailer and a spring under tension connected between the lower end of the bracket and that part of the attachment frame rigid with the trailer, and substantially balancing the downward pressure at said connection due to the trailer load.

5. A coupling apparatus for connecting a trailer to a power vehicle comprising an attachment frame having means for rigidly securing it to the trailer and having a clamping mechanism for rigid attachment to the power vehicle, said frame having a universal connection between the clamping mechanism and the part of the frame that is rigidly connected to the trailer the connection being positioned above the axle line of the power vehicle and the trailer, depending brackets on said frame in front of and behind the universal connection and resilient means under tension connected between said brackets and opposing settling of the frame at said universal connection.

6. A coupling apparatus for connecting a trailer to a power vehicle comprising an attachment frame having means for rigidly securing it to the trailer and having a clamping mechanism for rigid attachment to the power vehicle, said frame having a universal connection between the clamping mechanism and the part of the frame that is rigidly connected to the trailer, depending brackets on said frame in front of and behind the universal connection and a pair of springs having their ends spaced apart laterally and secured to said brackets, said springs being under tension to substantially balance the settling tendency at the universal connection.

HORACE D. HUME.

REFERENCES CITED

The following references are of record in the file of this patent:

UNITED STATES PATENTS

| Number | Name | Date |
|---|---|---|
| 2,064,615 | Kuchar | Dec. 15, 1936 |
| 2,238,095 | Almerantz | Apr. 15, 1941 |
| 2,341,965 | Wagner | Feb. 15, 1944 |